March 17, 1964     D. A. JOHNSON     3,125,513
FILTERING UNIT

Filed Jan. 25, 1961     2 Sheets-Sheet 1

INVENTOR
DAWSON ALLEN JOHNSON
BY Cushman, Darby & Cushman
ATTORNEYS

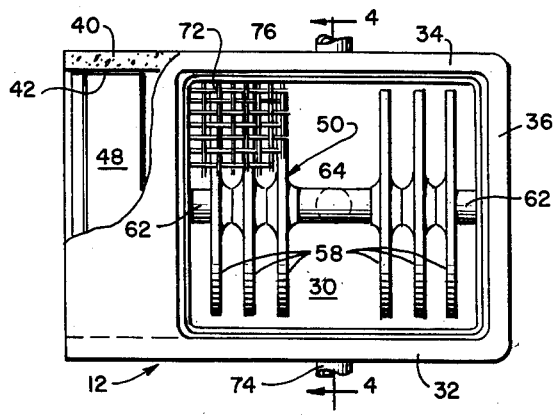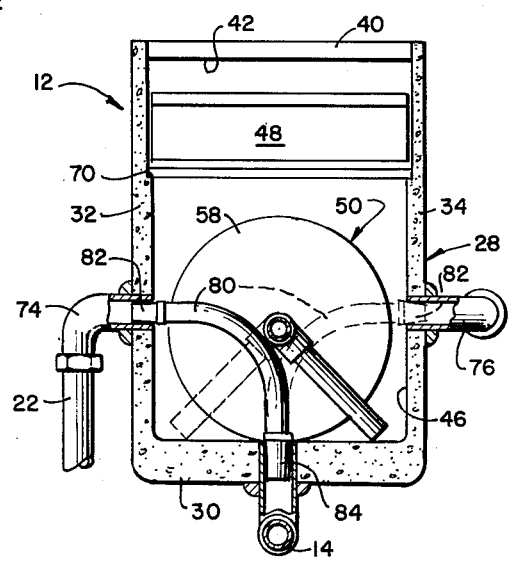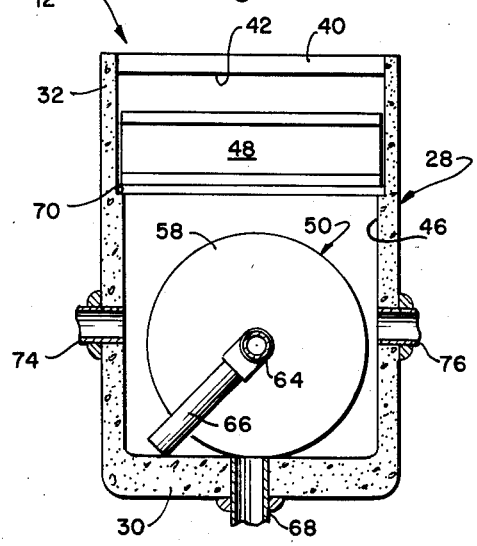

United States Patent Office 3,125,513
Patented Mar. 17, 1964

3,125,513
FILTERING UNIT
Dawson Allen Johnson, 1900 S. Ocean Drive,
Fort Lauderdale, Fla.
Filed Jan. 25, 1961, Ser. No. 84,818
5 Claims. (Cl. 210—169)

This invention relates to filtering systems and more particularly to an improved filtering apparatus for use in swimming pools and the like.

The conventional filtering system for a swimming pool usually embodies a filtering tank of cylindrical form provided with a suction outlet in the lower end thereof leading directly to the pump of the system. The usual filtering element comprises a plurality of vertically stacked horizontally extending filter discs mounted within the tank so that the water therein will pass through the filtering discs and outwardly through the outlet. Usually, the tank communicates at its upper end with a lateral water surface outlet having a suitable weir mounted therein for permitting foreign surface debris to pass thereover but preventing return of the same to the pool. The system also includes a return line from the pump to the pool, a suction line from the bottom of the pool or drain to the filtering tank and an auxiliary line from the wall of the pool to the filtering tank which is normally closed but can be opened for the purpose of attaching a vacuum cleaner or the like thereto. In the normal operation of this conventional system, it is necessary to periodically clean the filtering element and since the discs are disposed in veritcally stacked relation it is necessary to completely remove the entire filtering element from the tank to effect the cleaning operation. The necessity of removing the entire element makes the cleaning operation somewhat difficult and time-consuming.

It has been proposed to alleviate this problem by the provision of a filtering element which is provided with an elongated operating handle and is so mounted in the tank that it can be cleaned within the tank by suitably agitating the same through manipulation of the handle. While this arrangement permits the filtering element to be cleaned while the same is disposed within the tank, the structural arrangement is quite complicated and therefore is somewhat costly to produce and for this reason has not proven entirely acceptable in the industry.

Accordingly, an object of the present invention is to provide a filtering apparatus for use in swimming pools and the like which is of simple and economical construction and embodies a filtering element which can be readily cleaned without the necessity of removing the same from the filtering tank.

Another object of the present invention is the provision of a filtering apparatus of the type described having a filtering element mounted for movement within the tank from a normal operative position to an inoperative cleaning position, the filtering element extending vertically so that it can be readily cleaned when the element is disposed within the tank in its cleaning position.

As indicated above, the conventional filtering system provides three parallel flow paths through the filtering disc: one, the lateral surface outlet; two, the bottom drain outlet; and three, the normally-plugged vacuum cleaning outlet. The conventional system provides a removable vacuum lid which is operable to close off the lateral surface outlet when it is desired to either brush the bottom of the pool or to vacuum the same with a vacuum cleaner. During the brushing operation, the vacuum lid serves to close off the flow path to the pump from the lateral surface outlet so that all of the flow is through the bottom drain outlet. In this way, more suction at the drain outlet is present than in normal operation and the material removed from the bottom of the pool by the brushing operation will be carried more readily through the filtering system. In the vacuuming operation, the bottom drain outlet is suitably plugged and the vacuum outlet is opened and connected with the vacuum cleaner. The vacuum lid serves to close off the flow through the lateral surface outlet so that the entire flow to the pump is through the vacuum cleaner. While the use of the vacuum lid to effect the brushing and vacuuming operations has proven satisfactory in operation, it does present a problem of storage and requires some difficult manual procedures in the overall operation. Indeed, the provision of means which would perform the function of the vacuum lid in the handle actuated wash-in-place filtering apparatus proposal noted above constitutes the greatest source of expense thereto.

Accordingly, another object of the present invention is to provide filtering apparatus having a filtering element which is capable of being washed while disposed within the filtering tank, and which at the same time achieves all of the advantages of the use of a vacuum lid.

A still further object of the present invention is the provision of filtering apparatus having a filtering element which is capable of being washed within the filtering tank and improved means for selectively directing the flow through the filtering tank solely to either the bottom drain outlet or the vacuum cleaner outlet of the system.

These and other objects of the present invention will become more apparent during the course of the following detailed description and appended claims.

The invention may best be understood with reference to the accompanying drawings wherein an illustrative embodiment is shown.

In the drawings:

FIGURE 3 is a reduced top plan view of the unit shown in FIGURE 2;

FIGURE 4 is a cross-sectional view taken along the line 4—4 of FIGURE 3, showing the filtering element in its cleaning position within the filtering tank; and FIGURE 5 is a view similar to FIGURE 4 showing the filtering unit in the position it assumes during a brushing operation, the dotted lines indicating the position of the parts during a vacuuming operation.

Figure 1:
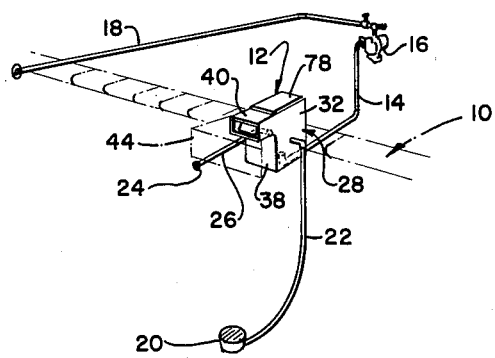
FIGURE 1 is a perspective view of a filtering system embodying the principles of the present invention showing the same applied to a swimming pool, a portion of the swimming pool being shown in phantom lines.
Figure 2:
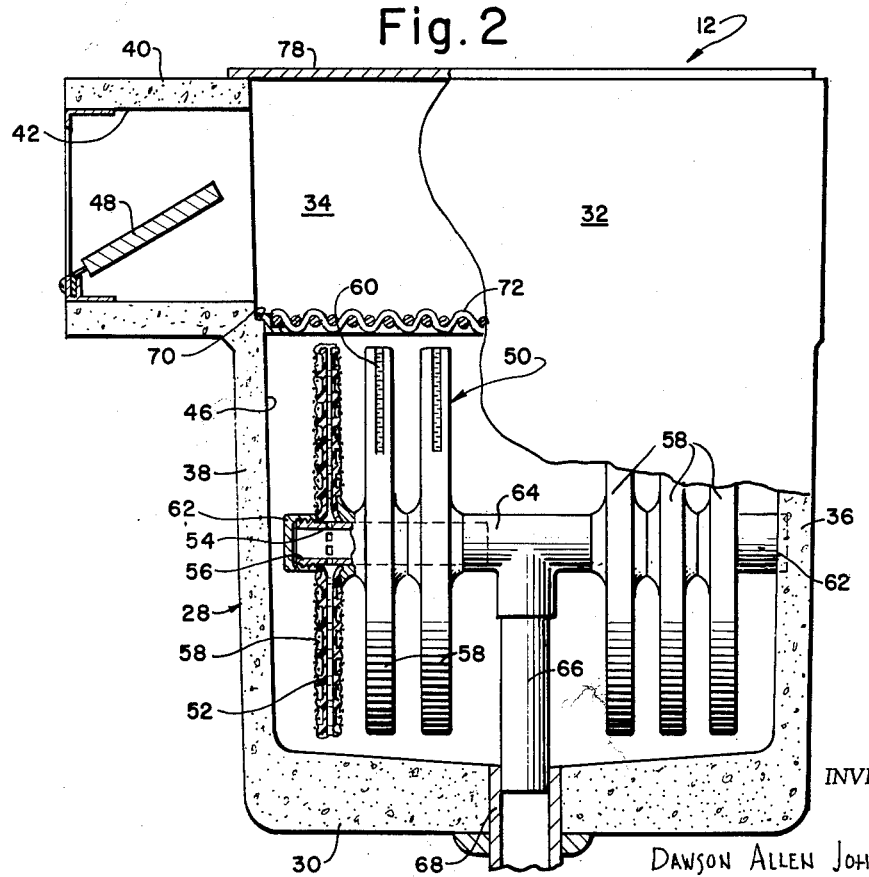
FIGURE 2 is an enlarged side elevational view, with parts broken away, of the filtering unit of the system.

Referring now more particularly to FIGURE 1 of the drawings, there is shown therein a swimming pool, generally indicated at 10, having a filtering system embodying the principles of the present invention applied thereto. The filtering system includes a filtering unit, generally indicated at 12, constructed in accordance with the principles of the present invention. Extending from the unit 12 is one end of a main suction line 14, the opposite end of which is connected with a pump unit, indicated at 16. The pump 16 may be of any conventional construction and preferably is of the type embodying a waste trap which is well-known in the art. Connected with the pressure side of the pump 16 is one end of a main return flow line 18, the opposite end of which communicates with a side of the pool 10 adjacent the water level thereof.

The system also includes a drain 20 mounted in the bottom of the pool and connected with the filtering unit 12 through a line 22. In addition, a vacuum outlet 24 is formed in a side of the pool, such outlet embodying the usual removable plug and being connected with the filtering unit through a line 26.

Referring now more particularly to FIGURES 2–5, the filtering unit 12 of the present invention comprises a filtering tank 28. The tank may be made of any suitable material, a preferable material being a lightweight aggregate cementitious product pre-cast in the shape illustrated in the drawings. Lightweight aggregate is readily available at relatively low cost in many parts of the country and for reasons of economy is preferred as the material with which the tank is constructed. However, it will be appreciated that the tank may be made of molded plastic, fabricated metal or other materials if desired.

The tank 28 includes a generally rectangular bottom wall 30, a pair of substantially vertical side walls 32 and 34 extending upwardly from the sides of the bottom wall, a rear end wall 36 extending upwardly from the rear end of the bottom wall in co-extensive relation to the side walls, and a front end wall 38 extending upwardly from the front end of the bottom wall between the front edges of the side walls 32 and 34. Extending laterally outwardly from the upper end of the front end wall 38 is a hollow section 40 which defines a lateral surface outlet opening 42.

The tank 28 is suitably mounted within the ground adjacent one side of the pool 10 with the outer end of the surface outlet opening 42 communicating with the side of the pool, as indicated at 44 in FIGURE 1, at a vertical position corresponding with the desired water level to be maintained in the pool. The inner end of the section 40 defining the lateral surface outlet opening 42 communicates with a filtering chamber 46 defined by the bottom wall 30, the side walls 32 and 34, and the end walls 36 and 38. Preferably, a swingable weir 48 is mounted within the lateral surface outlet opening to permit surface debris from the water in the pool to pass through the opening 42 into the filtering chamber 46 but to prevent movement of such debris out of the filtering chamber. To this end, the weir is preferably made of a material which is buoyant or is otherwise provided with a float or the like so that it will swing up and down in response to changes in the level of the water within the pool.

Disposed in the lower portion of the filtering chamber 46 is a filtering element, generally indicated at 50 which may be of any conventional construction. As shown, the filtering element preferably comprises a plurality of filtering discs 52 of grid-like construction molded of a suitable plastic material, the grid construction providing radially and longitudinally extending passages permitting flow into a series of circumferentially spaced openings 54 formed in a central pipe section 56 upon which the discs are mounted. The outer periphery of each disc 52 is covered by a filtering cloth 58 which also may be of any well-known design. As shown, each filtering cloth 58 is made up of a pair of centrally-apertured disc-shaped pieces secured along their peripheral edges by suitable stitching or other fastening means and an openable fastener, such as a zipper 60 so that they can be removed for replacement.

While any suitable number of filtering discs may be employed, as shown, there are six such discs, three being mounted on one pipe section 56 and the other three being mounted on a similar pipe section axially aligned therewith. The outer end of each pipe section is closed by a cap member 62 and the inner end thereof is secured to one branch of a T-fitting 64. The remaining branch of the T-fitting has a straight pipe section 66 extending therefrom which is adapted to engage within a fitting 68 formed in the central portion of the bottom wall 30 of the tank, the fitting 68 being connected exteriorly with the main suction line 14 of the system. It can thus be seen that water within the filtering chamber 46 will be drawn therefrom, by the action of the pump 16 and the main suction line 14 connected therewith, through each of the filter discs 52, each pipe section 56, the T-fitting 64 and the straight pipe section 66.

As previously indicated, water is allowed to enter the filtering chamber 46 from three parallel sources. First, water and debris from the surface of the pool may pass through the lateral outlet opening 42 and in this regard, preferably a suitable ledge 70 is formed in the filtering chamber 46 at a level adjacent the lower surface of the lateral outlet opening 42 so as to removably support a screen or basket 72 thereon which is adapted to screen out or catch relatively large surface debris, such as leaves, etc., entering the filtering chamber past the floating weir 48 and to prevent such debris from entering into the bottom portion of the filtering chamber so as to clog the filtering discs 52. Second, water may enter the filtering chamber 46 of the tank through the drain 20 and line 22. As best shown in FIGURE 4, the line 22 is communicated with the filtering chamber by means of an elbow fitting 74 mounted in the central portion of the side wall 32. The third source of water into the filtering tank comes from the normally closed vacuum fitting 24 through the line 26 and, as best shown in FIGURES 4 and 5, the line 26 is communicated with the filtering chamber through an elbow fitting 76 mounted in the central portion of the side wall 34. The upper end of the filtering chamber 46 is open to permit the filtering element 50 and basket 72 to be mounted therein. The open upper end is preferably closed by a suitable removable access cover 78.

In normal operation, the vacuum cleaner outlet 24 is closed so that water from the pool is drawn into the filtering chamber through the drain 20 and the lateral surface outlet opening 42. This water enters the filtering chamber 46 and passes through the filtering element 50, fitting 68, line 14, and then to the pump 16 where it is returned to the pool through the line 18. When it is desired to clean the filtering element, the cover 78 is removed and the basket 72 is likewise removed from the ledge 70. Next, the filtering element 50 is moved slightly upwardly to disengage the end of the straight pipe section 66 from the fitting 68 and then the filtering element is lowered into supporting relation to the bottom wall 30 of the tank with the pipe section extending at an angle, out of engagement with the fitting 68. In this condition, the filtering cloths 58 over the filtering discs 52 can be conveniently cleaned with the filtering element 50 disposed in the position shown in FIGURE 4. It will be noted that, since the filtering discs extend vertically, convenient access thereto can be readily obtained.

It will be understood that the filtering unit 12 as described above is readily susceptible of use with a conventional removable one-piece vacuum lid. Such a lid can be either mounted on top of the basket 72 or on the ledge 70 in lieu of the basket. Where such a vacuum lid is utilized it will be understood that a brushing operation can be carried out in the conventional manner in that all of the flow through the filtering element 50 will be through the drain 20 and the line 22. Likewise, a vacuuming operation may also be readily carried out in the conventional manner by plugging the drain 20 (or the fitting 74), unplugging the outlet 24 and connecting the vacuum cleaner thereto. Under these circumstances, the full flow would be through the vacuum cleaner and the line 26.

The rectangular shape of the tank of the present unit makes it convenient for use with a hinged vacuum lid. That is, a vacuum lid made up of two rectangular lid sections, one being pivoted along its outer edge to the side wall 32 adjacent the ledge 70 and the other being pivoted along its outer edge to the side wall 34 adjacent the ledge 70. With such an arrangement, each lid section would be normally pivoted into a vertical position adjacent its associated wall, thus alleviating the storage problem of the removable vacuum lids heretofore employed. In the operative position, the vacuum lid sections would be pivoted into the horizontal plane with the inner edges overlapping so as to provide a seal in the filtering chamber at the level of the ledge 70.

While it is possible to utilize either a conventional removable unitary vacuum lid or a self-storing sectional hinged vacuum lid construction with the present filtering unit, it is preferred to utilize for the purpose of brushing and vacuuming operations, a short jumper hose section 80, as shown in FIGURE 5. The jumper hose section 80 includes fittings 82 and 84 on the ends thereof which are adapted to cooperate with the fittings 68, 74, and 76.

With the use of the jumper hose 80, when it is desired to perform a brushing operation, the filtering unit 50 is moved into a position such as shown in solid lines in FIGURE 5 which generally corresponds to the cleaning position previously described. Next, the jumper hose is installed by engaging the fitting 82 within the fitting 74 and the fitting 84 within the fitting 68. With the jumper hose in this position, it will be noted that all of the flow from the drain will be directly to the pump. The material cleaned from the bottom of the pool by the brushing operation, rather than being filtered out by the filtering element 50, is caught directly in the waste trap of the pump unit.

When it is desired to perform a vacuuming operation, the filtering element 50 is again positioned in its cleaning position as shown in dotted lines in FIGURE 5, and the jumper hose is installed by engaging the fitting 82 within the fitting 76 and the fitting 84 within the fitting 68. Next, the plug is removed from the outlet 24 and the vacuum cleaner is connected thereto. Again it will be noted that full flow from the pump unit 16 will be through the vacuum cleaner, the line 26, the jumper hose 80, and the main suction line 14. Here again, the material cleaned from the pool by the vacuum cleaner is caught directly in the waste trap of the pump unit rather than the filtering element 50.

It thus will be seen that the objects of this invention have been fully and effectively accomplished. It will be realized, however, that the foregoing specific embodiment has been shown and described only for the purpose of illustrating the principles of the invention and is subject to extensive change without departure from such principles. Therefore, this invention includes all modifications encompassed within the spirit and scope of the following claims.

I claim:

1. A filtering unit for swimming pools and the like comprising a filtering tank defining a filtering chamber having an open top, said filtering tank having a hollow section extending laterally from the upper portion thereof defining a lateral surface outlet communicating with said chamber, a floating weir swingably mounted in said lateral surface outlet, fitting means disposed in said tank for communicating said filtering chamber with a pump suction line, and a filtering element mounted within said filtering chamber for movement within the latter between a normal operative position within said chamber wherein the entire flow from said chamber to the pump suction line is through said filtering element and a cleaning position within said chamber wherein the flow from said chamber to the pump suction line is direct and bypasses said filtering element, said filtering element comprising a plurality of vertically extending horizontally spaced grids, conduit means rigidly interconnecting said grids and having a central vertical outlet pipe communicating with the interiors of said grids, filtering cloth means covering each of said grids having the major surfaces thereof disposed generally vertically, said fitting means including an opening communicating with the bottom of said chamber for receiving the lower end of said pipe to support said filtering element in said operative position.

2. A filtering unit as defined in claim 1 wherein said conduit means rigidly interconnects the central portions of said grids.

3. A filtering unit as defined in claim 2 wherein each of said grids is of circular disc-like configuration.

4. A filtering unit as defined in claim 1 including a screen of a size to fit within said filtering chamber through the open top thereof, said filtering tank providing an annular shoulder adjacent to and below said hollow section and removably supporting said screen.

5. A filtering tank as defined in claim 1 wherein said filtering tank includes second fitting means mounted therein for communicating a drain outlet line with said chamber and third fitting means mounted therein for communicating a vacuum cleaner outlet line with said chamber.

References Cited in the file of this patent

UNITED STATES PATENTS

| | | |
|---|---|---|
| 2,826,307 | Pace | Mar. 11, 1958 |
| 2,844,255 | Cavenah et al. | July 22, 1958 |
| 2,914,180 | Konopka et al. | Nov. 24, 1959 |
| 2,957,580 | Hunziker | Oct. 25, 1960 |
| 2,960,232 | Gillette | Nov. 15, 1960 |
| 2,979,206 | Konopka et al. | Apr. 11, 1961 |
| 2,980,256 | Nash | Apr. 18, 1961 |